US006544383B2

United States Patent
Robinson et al.

(10) Patent No.: US 6,544,383 B2
(45) Date of Patent: Apr. 8, 2003

(54) FLOTATION DEINKING PROCESS

(75) Inventors: Peter Robinson, High Point, NC (US); Hugh Lavery, Pennington, NJ (US)

(73) Assignee: KAO Specialties Americas, High Point, NC (US)

(*) Notice: Subject to any disclaimer, the term of this patent is extended or adjusted under 35 U.S.C. 154(b) by 0 days.

(21) Appl. No.: 09/923,595

(22) Filed: Aug. 7, 2001

(65) Prior Publication Data

US 2002/0066880 A1 Jun. 6, 2002

Related U.S. Application Data

(60) Provisional application No. 60/223,414, filed on Aug. 7, 2000.

(51) Int. Cl.[7] .................................................. D21C 5/02
(52) U.S. Cl. ........................................... 162/5; 210/703
(58) Field of Search ..................... 162/5, 4; 252/60–61; 510/174; 210/702–705

(56) References Cited

U.S. PATENT DOCUMENTS

| | | | | |
|---|---|---|---|---|
| 4,483,741 A | * | 11/1984 | Maloney et al. | 162/5 |
| 4,964,949 A | * | 10/1990 | Hamaguchi et al. | 162/5 |
| 5,302,243 A | * | 4/1994 | Ishibashi et al. | 162/5 |
| 5,304,316 A | * | 4/1994 | Urushibata et al. | 252/60 |
| 5,417,808 A | * | 5/1995 | Okamoto et al. | 162/5 |
| 5,560,806 A | * | 10/1996 | Li et al. | 162/5 |
| 5,583,097 A | * | 12/1996 | Li et al. | 510/174 |
| 5,643,409 A | * | 7/1997 | Hamaguchi et al. | 162/5 |
| 5,660,684 A | * | 8/1997 | Li et al. | 162/5 |
| 5,695,603 A | * | 12/1997 | Shiba et al. | 162/5 |
| 5,712,233 A | * | 1/1998 | Rasheed | 510/174 |
| 5,718,801 A | * | 2/1998 | Li et al. | 162/5 |
| 5,840,157 A | * | 11/1998 | Hagiwara et al. | 162/5 |
| 6,013,157 A | * | 1/2000 | Li et al. | 162/5 |
| 6,077,389 A | * | 6/2000 | Sawai et al. | 162/4 |

* cited by examiner

Primary Examiner—Jose A. Fortuna
(74) Attorney, Agent, or Firm—Bruce Jacobs

(57) ABSTRACT

The removal of inks from a pulp fiber slurry is accomplished by use of a combination of (1) a polyester obtained through reaction between di and/or tricarboxylic acids and/or anhydrides thereof and a polyalkylene glycol or one or more alkylene oxides, (2) a first deinking agent which is an alkoxylated hydrophobic base, e.g. an alcohol, amine, acid, dimer acid, salts thereof, or the like, and (3) a second deinking agent which is a second alkoxylated hydrophobic base having a cloud point about 2 to 20° lower than the cloud point of the first deinking agent. Use of the three component combination allows an improved foam profile allowing longer continuous operation or one or more of a reduction in total chemical demand, optical bleach demand, and stickies.

27 Claims, 1 Drawing Sheet

FLOTATION DEINKING PROCESS

This application claims the benefit of Provisional Application No. 60/223,414, filed Aug. 7, 2000.

BACKGROUND OF THE INVENTION

Around the world the use of the recycled fiber is now growing. A number of countries have already legislated that a certain part of the total paper production shall be constituted of recycled fiber. The methods which are used today for deinking are the flotation process and the washing process. The flotation process dominates and is the subject of the present invention.

The present invention is directed to the removal of inks from recycled paper products, i.e. de-inking. "Deinking" is the process of removing ink and other contaminants from waste paper and there are two main techniques in current use. "Flotation deinking" entails forming an aqueous suspension of waste paper pulp fibers, ink, and other non-cellulosic contaminants and then mixing air into the suspension. In the presence of certain additives, air bubbles selectively attach to ink particles and carry those particles to the surface of the aqueous suspension, thereby forming an ink rich froth. The froth is then removed leaving behind a relatively ink-free fiber slurry.

A deinking process can be divided in three different steps; 1) disintegration/dissolution of recycled fiber and release of the printing ink from the fibers, 2) dispersing printing ink in the water phase and 3) separation of the printing ink. These three steps are included in both the flotation process and the wash process. The method which one uses depends on the requirements and conditions which are found where the activity is located. The flotation process generally has been found to remove the greatest amount of printing ink from a recycled fiber suspension and to be the most cost effective.

The first step of flotation deinking is to solvate/saturate the fiber and disengage the printing ink. When this is accomplished the particles must be modified so that they obtain suitable physical and chemical characteristics so that afterwards they can be lifted to the surface and removed with help of air bubbles.

Some parameters are important to be consider at the flotation, such as the size of the particle, airflow (particularly the air:stock ratio) in the notation cell, the size of the air-bubbles, temperature, flotation time, pulp consistency (the concentration of the recycled fibers in the flotation cell), pH, the concentration of the chemicals as well as the degree of the hardness of the water.

The flotation process is carried out in such a manner that the recycled raw material of the fiber is passed through mechanical treatment in combination with associated chemicals. There are different methods depending upon the specific chemicals used, the concentration of those chemicals, and methods to process the raw material. The purpose of the mechanical treatment is that the paper be disintegrated into fibers that together with the chemicals result in an efficient removal of print ink. However, a too strong mechanical influence can cause undesirable damage to the fibers as well as ink smearing and/or ink re-attachment due to fibers contacting one another.

Then comes filtering and dewatering, whereby the particle impurities are separated, followed by a purification step, generally by means of a vortex cleaner, where particles are separated. In a dispersing step the discharge of printing ink continues through mechanical treatment and chemical enhancement. Printing ink and any remaining small particles are separated subsequently in the flotation step. Different flotation techniques exist and in the more contemporary ones, one can float all small particles by pressurizing the flotation cell. Small impurities are separated through washing and to increase the brightness of the pulp, bleaching is performed through use of hydrogen peroxide, hydrosulfite, and the addition of conventional optical bleaches. Optical bleaches enhance the contrast between the ink and the paper background causing the paper to look brighter and to enhance ink colors.

Flotation deinking processes are especially useful in removing hydrophobic inks with particle sizes larger than about 10 $\mu$m. The additives used in such processes are generally specialty surfactants or fatty acids which are intended to agglomerate the relatively finer ink particles to increase removal efficiency in the flotation stage. The presence of additives which over-disperse the ink particles rather than agglomerate them is considered detrimental to the effectiveness of the flotation stage.

Newspapers, magazines and other printed media have been recycled for many years. Recently the need to recycle paper has increased significantly and will likely continue to increase in the future in view of environmental concerns and legislative action. To reclaim fibers from printed material, a deinking process is required to remove the ink and other contaminants. Deinking of waste paper has become increasingly more difficult because of changes in the printing techniques being used and the wide variety of printing inks. As a result a slurry of recycled waste paper contains a complex mixture of inks, resin binders, fillers, and the like, which must be removed.

The conventional industry chemical formulations for flotation deinking for many years have included a fatty acid or fatty acid soap. See, for example, U.S. Pat. Nos. 4,964,949 and 4,483,741. However, fatty acids and fatty acid soaps have a number of problems associated with them, e.g. high dosage rates (typically about 16 pounds/ton of waste paper but as high as 30 pounds/ton), relatively poor foamability thus causing the high dosage rates, and the general need for high levels of water hardness to achieve acceptable performance. The hard water often leads to handling problems as well as scale and deposit buildup in mill equipment. More recently, non-ionic surfactants have been developed for use in deinking systems.

The use of various types of cationic materials in compositions for removal of inks from waste paper has been disclosed in several earlier patents. For example, polyoxyalkylene compounds containing amine or quaternary ammonium groups have been disclosed in such as U.S. Pat. Nos. 4,483,741, 4,605,773, JP 59 137587, DE 3,928,599, DE 4,007,598, and DE 4,007,597. Similar formulations which are claimed to be effective specifically for deinking of paper printed with flexographic inks have been disclosed in DE 4,007,596, WO 90 05806 and EP 478505. Surfactants such as the ones described in the preceding patents may be regarded as materials in which a single substance contains both non-ionic and cationic moieties. None of these prior art compositions, however, have been found capable of adequately removing the very fine hydrophilic inks in a flotation deinking stage or a combined flotation and wash deinking system.

U.S. Pat. No. 5,736,622 discloses a synthetic collector which consists of a polyester based on a polyalkylene glycol and a di or tricarboxylic acid. The patent goes on to improve on such a deinking agent by adding into the polymerization mixture a saturated fatty acid with 12–18 carbon atoms, and controlling the molecular weight to be between 3,000 and 10,000.

While a polyester has been found to be helpful in improving brightness and ink removal efficiency, the performance has not been found to be sustainable under continuous real world mill operations due to adverse changes in the foam profile, i.e. the foam begins to build with time and will not collapse at the desired rate to efficiently remove the ink. Further, the extended foam lifetime has been found to result in rejects backup which results in float cell leveling and overflow/surging problems. The addition of conventional defoamers, e.g. silica/silicone and ethylene oxide/propylene oxide surfactants and the like, have not corrected the problem. Rather they have been found to persist in the system and penalize generation of the desired de-inking foam profile. Ink re-attachment has been observed with use of the defoamers.

Accordingly, it is an object of the present invention to provide a method of deinking printed media whereby improved foam control allows enhanced continuous running conditions, i.e. without loss of brightness and/or ink removal efficiency over time.

It is a further object of the invention to remove the inks while minimizing the total chemical demand of the process.

It is a still further object of the invention to reduce optical bleach demand.

It is a still further object of the invention to reduce the amount of stickies in a paper pulp.

These and still further objects will be apparent from the ensuing description of the present invention.

SUMMARY OF THE INVENTION

The present invention is directed to a deinking method which is useful in removing inks from recycled printed media in a flotation deinking system or combined flotation/ wash deinking system. The flotation deinking method generally entails adding to an aqueous waste paper pulp slurry each of (1) a polyester obtained through reaction between di and/or tricarboxylic acids and/or anhydrides thereof and a polyalkylene oxide or an alkylene oxide, (2) a first deinking agent which is an alkoxylated hydrophobic base, e.g. an alcohol, amine, acid, dimer acid, salts thereof, or the like, and (3) a second deinking agent which is an alkoxylated hydrophobic base and which has a cloud point about 2 to 20°, preferably about 4–18°, lower than the cloud point of the first deinking agent. The deinking method of the present invention effectively and efficiently removes ink in a flotation process or in the flotation stage of a combined flotation/ wash process.

By using this combination of materials at appropriate levels and in the appropriate sequence, improved release of the inks from the waste paper fibers can be accomplished without over-dispersing the inks while simultaneously initiating agglomeration of the fine ink particles and then completing the agglomeration to a sufficient extent that the ink particles coalesce and are of sufficient size to be effectively and efficiently removed in the froth of conventional flotation deinking equipment.

DETAILED DESCRIPTION OF THE INVENTION

Figure 1:
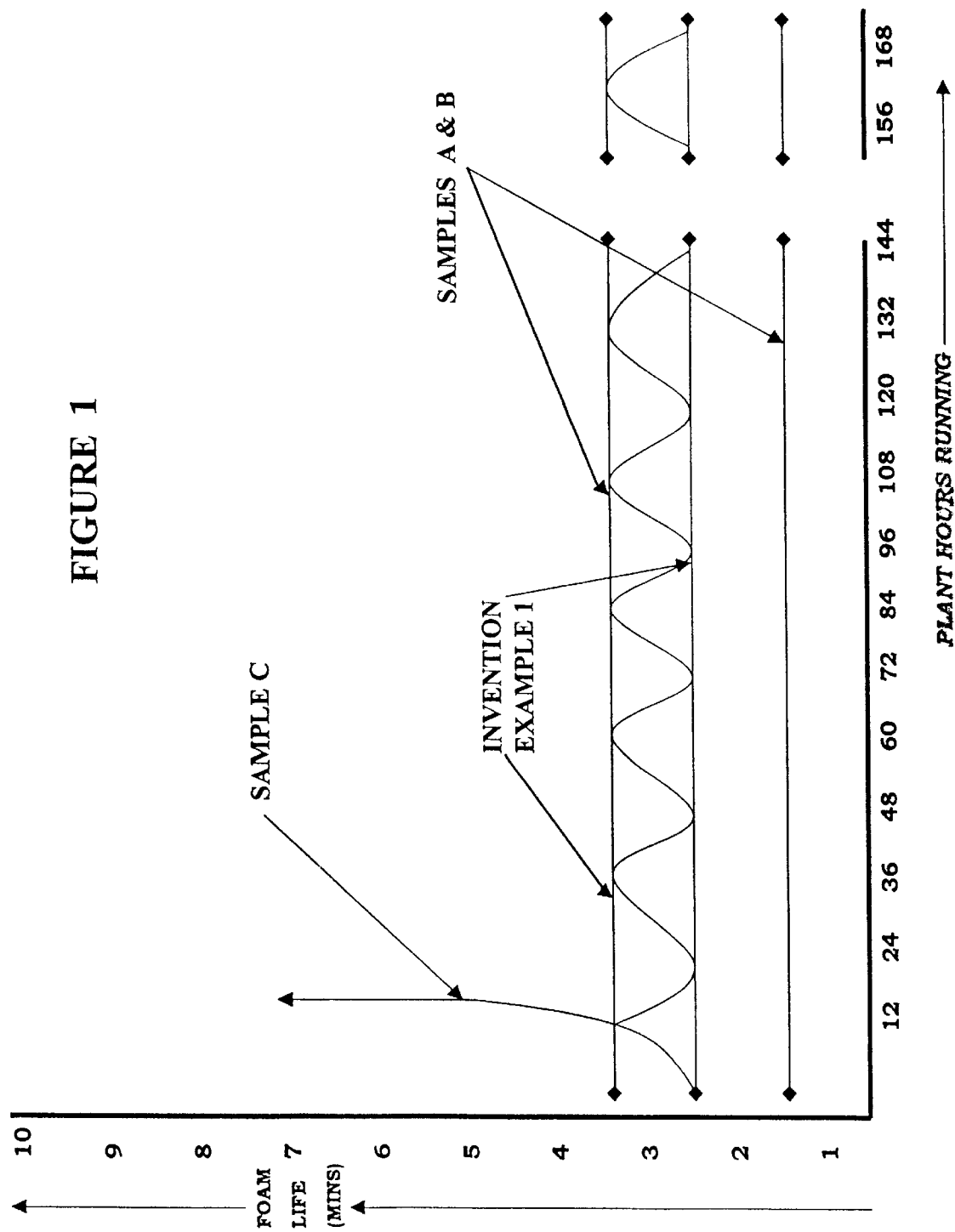
FIG. 1 is a graph of foam life in minutes vs. plant hours running showing the foam profiles of the samples of Example 1.

More particularly, the present invention entails adding to an aqueous waste paper pulp slurry each of (1) a polyester obtained through reaction between a di- and/or tri-carboxylic acid and/or anhydride thereof with an alkylene oxide or a polyalkylene oxide, (2) a first deinking agent which is an alkoxylated hydrophobic base, e.g. an alcohol, amine, acid, dimer acid, salts thereof, or the like, and (3) a second deinking agent which is an alkoxylated hydrophobic base and which has a cloud point about 2 to 20°, preferably 4 to 18°, lower than the cloud point of the first deinking agent. The combination may further contain a fatty acid or salt thereof.

The polyesters for use herein may be obtained through reaction of (a) a hydrophobe, i.e. a dicarboxylic acid, a tricarboxylic acid, an anhydride of a dicarboxylic acid, an anhydride of a tricarboxylic acid, and combinations thereof with (b) a hydrophile, i.e. polyalkylene glycol or an alkylene oxide in an alkoxylation reaction. The hydrophobic acids/ anhydrides may be either aliphatic or aromatic. Preferably for better foam control ring structures are used. Such acids and anhydrides are well known and commercially available from numerous sources.

A particularly preferred class of cyclic aliphatic di-acids are of the formula:

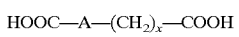

wherein A is a cyclic aliphatic group having 6 to 10 carbon atoms and x is an integer from 0 to about 15. While the acid groups may be ortho, meta or para, they are preferably ortho or para. Optionally, the ring is further substituted with one or more hydrophobic groups, such as a straight or branched chain alkyl group having about 3 to 18, preferably about 4 to 12, carbon atoms.

Still further optionally a portion of the cyclic di- and/or tri-carboxylic acid and/or anhydride is substituted by sulphate or other anions. Increased anionicity has been found to enhance the removal of stickies.

Suitable alkylene oxides have 2 to 4 carbon atoms, preferably 2 to 3, and most preferably 2. While mixtures of alkylene oxides may be used, no benefit from so doing has been observed. If a hydrophilic polyalkylene oxide polymer is used, it is prepared from the same alkylene oxides.

The polyester generally has a hydrophobe loading of about 35 to 55 wt %, a hydrophile loading of about 35 to 55 wt %, and a terminal carboxyl content of about 5 to 15 wt %. Preferably, the polyester has a molecular weight in the range of about 2,500 to 5,000 daltons, though higher or lower molecular weight polymers may be used in specific circumstances depending upon the specific composition of the materials being deinked.

The first deinking agent is an alkoxylated hydrophobic base. Suitable hydrophobic bases include any compounds which are hydrophobic and which can be alkoxylated by reaction with an alkylene oxide. Examples of such compounds include alcohols, amines, acids, dimer acids, and salts thereof. Most commonly an alcohol or an acid will be used. Generally the hydrophobe compound will contain about 12 to 60 carbon atoms, preferably about 12 to 30 carbon atoms, and most preferably about 14 to 20 carbon atoms. Suitable alkylene oxides have 2 to 4 carbon atoms, 2 or 3. Generally a mixture of two alkylene oxides will be used, either jointly or sequentially to form a block or a random configuration.

The second deinking agent, like the first, is an alkoxylated hydrophobic base, but it has a cloud point of about 2 to 20° C. below the cloud point of the first deinking agent. Peferably the cloud point is about 4 to 18° below that of the first deinking agent Suitable hydrophobic bases include any compounds which are hydrophobic and which can be alkoxylated by reaction with an alkylene oxide. Examples of such compounds include alcohols, amines, acids, dimer acids, and salts thereof. Most commonly an alcohol or an acid will be used. Generally the hydrophobe compound will contain about 12 to 60 carbon atoms, preferably about 12 to 30 carbon atoms, and most preferably about 14 to 20 carbon atoms. Suitable alkylene oxides have 2 to 4 carbon atoms, preferably 2 or 3. Generally a mixture of two alkylene oxides will be used, either jointly or sequentially to form a block or a random configuration.

Table 1 identifies some alkoxylated hydrophobic bases suitable for use as either the first or second deinking agent, depending upon the specific cloud point of the alkoxylated base. The cloud point is determined in a water solution between 0 and 100° C. by heating a solution of the sample being analyzed until the solution clouds, then cooling until the solution clears. The temperature at which the solution clears is the cloud point.

TABLE 1

| Deinking Agent | Hydrophobe | Moles EO | Moles PO | Moles EO | Addition | Cloud Point, °C. |
|---|---|---|---|---|---|---|
| 1 | C18 alcohol | 21 | 6 | | random | 72 |
| 2 | C18 alcohol | 6 | 21 | 6 | block | 62–64 |
| 3 | Tallow | 54 | 18 | | random | 63 |
| 4 | C18 alcohol | 63 | 28 | | random | 62 |
| 5 | Stearic acid | 19.5 | 8 | | random | 55–62 |
| 6 | C18 alcohol | 51 | 39 | | random | 52 |
| 7 | C18 alcohol | 10 | 20 | 10 | block | 48–50 |
| 8 | Stearic acid | 19.5 | 8 | | random | 48–50 |
| 9 | C18 alcohol | 45 | 45 | | random | 44 |
| 10 | C18 alcohol | 10 | 15 | 10 | block | 35 |

Generally the polyester, the first deinking agent, and the second deinking agent are used in as low amounts as will produce the desired deinking effect. The polyester is generally used in an amount of about 0.05 to about 0.5 wt % based on the total weight of fiber present, preferably about 0.075 to about 0.25 wt %. The two deinking agents are used in a ratio of about 1:10 to about 10:1 and in a total amount of about 0.001 to 0.3 wt % based on the total weight of fiber present. The specific amounts to be used for optimum performance will vary depending upon many factors including the equipment being used and the specific recycle composition. Thus they must be determined by routine trial and error testing.

While a fatty acid or salt thereof of the formula RCOO—M, wherein R is a linear, branched, or cyclic alkyl or alkenyl group having about 7 to about 48 carbon atoms and M is hydrogen or a counterion such as Na, K, Ca, $NH_4$, or $NH_x(CH_2CH_2OH)_y$, wherein x and y are each integers from 0 to 4 and total 4, may be added along with the the polyester and the two alkoxylated deinking agents, so doing is no preferred due to the problems caused by use/compatibility of such compounds. When used, however, for economic reasons the fatty acid or salt thereof are most commonly used in the form of mixtures of such materials having about 12 to 48 carbon atoms and derived from natural oils such as marine, rapeseed, tallow, tall oil, soy cottonseed, coconut, and the like. The fatty acid functions primarily to agglomerate ink particles. The fatty acid or the salt thereof may be present in an amount from about 0.05 to 1.5 wt % based upon the weight of the waste paper, more preferably from about 0.1 to 0.5 wt %, and most preferably from about 0.2 to 0.5 wt %. The fatty acid or salt may be added either to an aqueous pulp slurry at the pulping stage or to the pulp slurry prior to its introduction to the flotation stage.

The deinking procedure of the present invention entails the use of a flotation stage to remove inks, including very fine hydrophilic inks (flexographic inks) from printed media, particularly some waste newspapers wherein up to 100% of the ink may be flexographic.

Generally, the process comprises a pulping step wherein printed waste paper, sometimes in combination with virgin wood pulp, is treated in an alkaline medium with water in a reactor having an agitation system. The aqueous suspension so formed contains pulp fiber, inks, coatings, inorganic fillers, and the like, in an amount of from about 3 to 18 wt % and is maintained at a pH of about 7.5 to 11. Typical chemicals used in the pulper have conventionally included such as NaOH and hydrogen peroxide. Sodium silicate, a metal chelating agent such as diethylenetriaminepentaacetic acid (DTPA), and calcium chloride have also been added to the pulper and/or flotation to maintain water hardness to ensure calcium soap formation. It is a particular benefit of the present invention that the total chemical demand of the pulping process can be reduced by the more efficient removal of the ink which permits use of less severe conditions and/or less chemicals.

As indicated the sodium hydroxide adjusts the pH to be alkaline to aid ink release, swell cellulose fibers, wet the fibers, and disperse the released ink, fillers, etc. It also neutralizes chemical components such as fatty acids and provides the desired pH for subsequent bleaching and the flotation steps. How-ever, the downside is increased fiber yellowing (a pronounced effect at $pH \geq 9.5$ which requires correction by the addition of bleaching agents), saponification of organics (the binders and adhesives in the recycled paper products) which results in stickies and machine deposits and release/formation of colloidal material via alkaline peptization which can adversely effect the efficiency of the foam to effectively transport the released ink during the flotation. Also the released organics and colloids contaminate the water circuits which in turn increases the BOD/COD (biological oxygen demand/chemical oxygen demand) and the demand for water treatment chemical clean-up before discharge or reuse.

Hydrogen peroxide is typically used as a bleaching agent and in the pulper to offset the adverse effects of excessive sodium hydroxide. Other conventional bleach-ing agents, e.g. sodium hyposulfite, and optical bleaches such as sulfonated stilbenes, may be used.

Sodium silicate is used to provide system buffering and metal chelation. It is used to avoid pH shocks which could result in deposits, and as a wetting or anti-corrosion agent, bleaching agent stabilizer and a source of alkalinity for pH control. The downside of using the silicate include its strong dispersive action and colloid generation which result in variable foam flotation profiles which can negatively impact ink removal.

These downside effects are reduced in the present invention by operating at low sodium hydroxide levels thereby avoiding the need for the hydrogen peroxide and silicate during pulping. Also, the need for biocides to prevent enzyme (peroxidase and catalase) loss of the hydrogen peroxide is eliminated during final bleaching. Furthermore, the associated additives for deposit/scale control are negated since the use of fatty acids can be minimized or avoided and no additional calcium is needed to ensure calcium soap formation and organics/colloid interference to the process is minimized.

According to the process of this invention, the three components can be added directly to the pulper during the pulping stage, preferably near the beginning thereof, or to the flotation cell prior to flotation. The components can be added individually or they may be pre-mixed. Mill conditions will determine the most suitable conditions.

After the slurry exits the pulper, it is diluted to about 1 wt % solids. If a fatty acid or salt thereof is used, it may be added. Alternatively, the fatty acid component may be added partially during the pulping operation and partially upon entry to flotation. Thereafter, air is introduced into the flotation equipment to cause vigorous mixing of the diluted pulp slurry and to ensure foam generation for ink transport/removal from the system.

As a result of the addition of the combination of (1) the polyester, (2) the first alkoxylated deinking agent, and (3) the second lower cloud point deinking agent, the ink particles are released from the recycled printed media and agglomerated into larger particles. The air bubbles then attach to the agglomerated ink particles and carry the agglomerated particles to the surface of the flotation equipment and form a foam thereon. This ink-rich foam is removed from the surface in any of the conventional manners well known in the art of deinking. A particular benefit of the present invention is the character of the foam which is produced. The foam has high ink carrying capability that upon leaving the flotation cell collapses in a regular and controlled manner so that the resulting inky liquid can be easily removed and sent to waste treatment for final disposal.

Following the flotation deinking procedure, the pulp slurry is thickened to about 6 to 12 wt % solids and washed using conventional equipment readily available and in widespread commercial use. The filtrate from the washing is typically treated in a dissolved air flotation (DAF) clarifier to remove inks, fillers, fiber fines, and other suspended solids so that the filtrate water can be recycled for use in a subsequent deinking procedure. Commonly, cationic, nonionic and/or anionic polymers are added to the filtrate prior to or in the dissolved air flotation clarifier so that the suspended solids will be agglomerated and/or flocculated and removed.

Many modifications and variations of the basic deinking procedure explained herein have been proposed and/or are in commercial use and the method of the present invention may be applied to those procedures. The simple system explained herein is used for illustration purposes only and is not meant to be in limitation of the scope of this invention. The pulping process may be carried out either in a continuous way or batchwise, with excellent results with any type of printed media including newspaper, magazines, printed cardboard and colored printed media. The recycled paper is fed to the process so that it is present in an amount of about 10 to 100 wt % of the fiber undergoing pulping. The equipment used in this process is conventional equipment which is readily available and in widespread use.

The use of the deinking components of the present invention has several advantages when compared to the conventional prior art. Compared to conventional deinking methods, a significant reduction in total chemical demand is realized when using this method. The ink removal rate is often also increased over conventional flotation methods, resulting in either increased production rates without sacrifice of product quality. Most importantly, the foam profile is such that extended continuous operations result.

While most preferably no fatty acid is used in the present process, there will be situation when a small amount is desirable. The dosage rate of the fatty acid component of the composition can be substantially reduced from the 1 to 2 wt % for a conventional process to below about 0.2 wt %, preferably below about 0.1 wt %, based on the total weight of fiber for the present invention. The none or lower amount significantly reduces the potential for scale and deposit problems normally associated with fatty acid components of deinking formulations both in the deinking equipment itself and at the subsequent paper machine. Expensive downtime for equipment clean-up is minimized and a higher quality final paper product can be produced.

Environmental concerns are causing paper mills to continually seek to reduce the amount of fresh water used. This means that increasing amounts of mill water must be reused. It is an advantage of the present invention that not only is the clarity of the filtrates produced in washing stages following the flotation deinking stage improved but also the subsequent drainage rate because of an increased removal of both inorganic fillers, e.g. calcium carbonate and titanium dioxide, and fiber fines which are in the waste paper pulp slurry being treated. In view of improved filtrate clarity, the amount of flocculants required for water clarification and subsequent reuse is reduced. In view of increased drainage rate, plant through-put can be increased.

The advantages of the deinking composition of the present invention as compared with conventional deinking compositions are further illustrated in the following Examples in which all parts and percents are by weight unless otherwise specified. All filter pads for brightness were made using alum as specified in TAPPI Test Method T 218 om-83. Where necessary the pulp samples were first diluted to 1 wt % solids (equivalent to a 3 gram air-dried sheet) with tap water, 2 ml of 10% alum solution added to each sample, and the slurry then thickened on a Buchner funnel using Ahlstrom grade 631-25 filter paper. The filter pads were air dried before taking brightness measurements. All brightness data was obtained using an ACS Spectrosensor II spectrophotometer and reported as TAPPI 452 brightness. The brightness data represents the percent of light at wavelength 452 nanometers which is reflected off the filter pad and recorded by the spectrophotometer.

EXAMPLE 1

A mixture of 35% MAG (old magazines), 65% ONP (old newspapers) were shredded dry and combined. The mixture was added to a plant pulper along with water (120° F.) and the each of the four different deinking/flotation deinking chemical systems specified in Table 2. The pulps had a consistency of about 12–14%.

The polyester was the 1:1 molar reaction product of 5(6)-carboxy-4-hexyl-2-cyclohexene-1-octanoic acid with polyethylene glycol (mw 1450). "Deink agent 1" was a block ethoxylated and propoxylated C-18 alcohol having a cloud point of 48–50° C. "Deink agent 2" was a random ethoxylated and propoxylated C-18 alcohol having a cloud point of 42–44° C. The fatty acid was predominantly C-18.

In Table 2, "A" is a prior art conventional fatty acid only foaming system used in the plant. "B" is a prior conventional fatty acid/alkoxylated hydrophobe blend deinking system used in the plant. "C" is a blend of an aromatic polyester and a single alkoxylated hydrophobe deinking system. "Example 1" is a composition of the present invention utilizing the 3 component deinking system applied under plant conditions.

The bleach demand for samples "A" and "B" was 0.4 wt % in each of the pulper and the tower. The bleach demand for samples "C" and Example 1 was 0 in the pulper and 0.6 wt % in the tower The deinking performance of the 4 deinking compositions was evaluated and the results are shown in Table 3. After each of the four combinations of chemicals, water and waste paper was pulped for 15–20 minutes, test samples were taken. The samples were diluted to 1% using additional water and deinking performance determined. Filter pads were made for measuring the brightness of the deinked pulp at this point. The balance of the pulp slurry was then passed into the plant's normal flotation cell. The foam that collected on the surface was allowed to flow over a weir and the foam characteristics determined. Another filter pad was made for measuring the brightness of the deinked pulp after flotation.

TABLE 3

| | Deinking Performance | | | | | | | |
|---|---|---|---|---|---|---|---|---|
| | Float Feed | | Float Accepts | | Cell | | Finals | |
| Sample | BRT | ERIC | BRT | ERIC | Gain | pH | BRT | ERIC |
| A | 44 | 850 | 54.8 | 280 | 10.8 | 9.4 | 59 | 150–200 |
| B | 43 | 896 | 54.4 | <200 | 11.4 | 9.2 | 60 | 150–200 |
| C | 44 | 920 | 52.7 | <180 | 8.7 | 8.2 | 59 | 150–200 |
| 1 | 43 | 1100 | 52.0 | <200 | 9.0 | 8.2 | 59 | 150–200 |

"BRT" = brightness
"ERIC" = estimated residual ink count

FIG. 1 provides the Foam Profiles of extended continuous plant runs using the four systems. The Foam Profiles graphs foam life (in minutes) vs. plant running time (in hours).

As shown in FIG. 1, Samples A and B (conventional fatty acid deinking with sodium salt of stearic acid) exhibited a typical wide operating band of foam life ranging from about 1.5 to 3.5 minutes. Sample A had a foam density ρ of 0.15–0.2 g/cc and a low foam half life of 1.5 minutes. Sample B had a foam density ρ of 0.2–0.3 g/cc, which indicates a higher ink content than Sample A, and a foam half life of 2.5–3.5 minutes.

Sample C produced a foam which continued to increase and did not collapse on a regular basis. Sample C had a higher foam density ρ of 0.25–0.35 g/cc which indicates a still higher ink carrying capability than Samples A and B, but in view of the foam not collapsing, the system is not useful in the absence of a defoamer, the use of which causes the aforementioned problems.

Sample 1 (invention) exhibited a quite narrow operating band with foam life ranging from 2.5 to 3.5 minutes. Sample 1 had a high foam density ρ of 0.2–0.3 g/cc, which indicates good a high ink content. The half life of the foam was less than 2 minutes. The three component deinking composition produced an excellent foam profile while simultaneously

TABLE 2

| | | Chemical Regimes - % on Dry Fiber | | | | | | |
|---|---|---|---|---|---|---|---|---|
| Test Sample | Fatty Acid | Silicate | Poly-ester | Deink Agent 1 | Deink Agent 2 | NaOH | Biocide (ppm) | Bleach Demand | |
| | | | | | | | | pulper | tower |
| A | 0.45 | 1.8 | — | — | — | 0.35 | 20 | 0.40 | 0.42 |
| B | 0.12 | 1.8 | — | 0.05 | — | 0.34 | 20 | 0.40 | 0.60 |
| C | — | — | 0.025 | 0.09 | — | 0.20 | — | — | 0.60 |
| 1 | — | — | 0.025 | 0.06 | 0.03 | 0.20 | — | — | 0.60 | allowing a reduction in the sodium hydroxide/silicate requirement from 2.25 wt % to 0.2 wt %.

EXAMPLE 2

The procedure of Example 1 was repeated at a plant processing mixed office waste paper at a rate of 265 tons per day (TPD). This actual mill data resulted from on-line 24-hr processing at this low yield plant (about 50%). With mixed office waste feed, the focus is on quality. The trial covered three of the 10 grades of paper produced at the plant.

"DIA-3" was a block ethoxylated and propoxylated C-18 alcohol having a cloud point of 62° C. "DIA-4" was a random ethoxylated and propoxylated C-18 alcohol having a cloud point of 44° C. The polyester was the 1:1 molar reaction product of 5(6)-carboxy-4-hexyl-2-cyclohexene-1-octanoic acid with polyethylene glycol (mw 1450). The fatty acid was predominantly C-18.

The various compositions evaluated and the resulting performances are given in Table 4 in which "Dirt" is the residual ink count in ppm, "SPEC Count" is the residual count of other materials such as plastics, hot melt adhesive resins, binders etc., and "Bleach optical" is the optical bleach demand as a percentage of the plant's normal bleach demand.

TABLE 4

| Chemical Regime % on dry fiber | | | | Performance | | | |
|---|---|---|---|---|---|---|---|
| Fatty Acid | DIA-3 62° | DIA-4 44° | Poly-ester | Dirt (ppm) | SPEC Count | Bleach Optical | Comments |
| 0.90 | 0.12 | — | — | 6–8 | 800–1200 | 100.0 | Control |
| 0.45 | 0.12 | 0.03 | 0.100 | 4–6 | ≦600 | 64.0 | Reduced bleach 10 day run |
| 0.90 | 0.12 | 0.03 | — | 6–8 | 800–1000 | 100.0 | |
| 0.30 | 0.12 | 0.03 | 0.100 | 6–8 | 700–800 | 67.0 | Reduced bleach 42 day run |
| 0.30 | 0.12 | 0.03 | 0.075 | 6–8 | 600–800 | 80.0 | Reduced bleach 4 day run |
| 0.30 | 0.12 | 0.03 | 0.040 | ≧10 | 800–1000 | 90.0 | Reduced bleach 4 day run |

The results demonstrate the overall reduced chemical demand for a three component system as well as a substantial reduction in the optical bleach demand. The fatty acid demand was reduced by 50% and the optical bleach demand by 30–36%. Annualized savings from the reduced optical bleach demand for just the three of 10 paper grades manufactured at the plant is estimated at more that $300,000.

EXAMPLE 3

The procedure of Example 1 was repeated on a mixed office waste furnish while varying the composition of the polyester resin. The first was as disclosed in Example 1, the second contained 1.9 wt % of the sodium salt of dimethylsulfoisophthalate, and the third contained 5 wt % of the same salt. When the polyesters were used in a three component deinking system, the level of stickies found in the deinked product was reduced as the amount of the anionic salt increases.

EXAMPLE 4

The procedure of Example 1 was repeated at a deinked market pulp operation processing a 70:30 ratio of old newspaper:magazines. The plant was typically operating with 0.44% fatty acid and 0.06% of DIA-3 to produce paper having a brightness of 60–62 with an ERIC spread of 130–180, of which the majority was 130–160.

Using a deinking combination of 0.31% fatty acid, 0.05% of DIA-3 having a cloud point of 62–64°, 0.01% of DIA-4 having a cloud point of 44°, and 0.05% of the polyester, the brightness values exceeded 62 with a 30% reduction in hydrogen peroxide and ERIC values being tightened to 110–130. This improved performance was obtained with a 30% reduction in fatty acid usage while sodium hydroxide and silicate were kept at plant levels.

What is claimed is:

1. A method of performing flotation deinking which comprises adding to an aqueous waste paper pulp slurry each of (1) a polyester obtained through reaction between a di or tricarboxylic acid or anhydride thereof with a polyalkylene oxide or with an alkylene oxide, (2) a first deinking agent which is an alkoxylated hydrophobic base and (3) a second deinking agent which is an alkoxylated hydrophobic base and which has a cloud point about 2 to 20° lower than the cloud point of the first deinking agent.

2. The method if claim 1, wherein the polyester is prepared from a cyclic aliphatic di-acids of the formula:

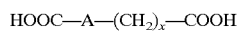

wherein A is a cyclic aliphatic group having 6 to 10 carbon atoms and x is an integer from 0 to about 15.

3. The method of claim 2, wherein the COOH groups are ortho or para to each other.

4. The method of claim 2, wherein the cyclic aliphatic group is further substituted with one or more hydrophobic groups.

5. The method of claim 4, wherein the hydrophobic group is a straight or branched chain alkyl group having about 3 to 18 carbon atoms.

6. The method of claim 1, wherein the polyester is prepared by reaction with a polyalkylene oxide polymer which was prepared from an alkylene oxide having 2 to 4 carbon atoms.

7. The method of claim 1, wherein the polyester has a hydrophobe loading of about 35 to 55 wt %, a hydrophile loading of about 35 to 55 wt %, and a terminal carboxyl content of about 5 to 15 wt %.

8. The method of claim 1, wherein a portion of the cyclic di- and/or tri-carboxylic acid and/or anhydride is substituted by an anion.

9. The method of claim 8, wherein the anion is sulfate.

10. The method of claim 1, wherein the hydrophobic base of the first and second deinking agents are each independently selected from alcohols, amines, acids, dimer acids, and salts thereof containing about 12 to 60 carbon atoms.

11. The method of claim 1, wherein the second deinking agent has a cloud point which is about 4 to 18° below that of the first deinking agent.

12. The method of claim 1, wherein the polyester is used in an amount of about 0.05 to about 0.5 wt % based on the total weight of fiber present, and the two deinking agents are used in a weight ratio of about 1:10 to about 10:1 and in a total amount of about 0.001 to 0.3 wt % based on the total weight of fiber present.

13. The method of claim 1, wherein the flotation deinking is performed in the further presence of a fatty acid or salt thereof of the formula RCOO—M, wherein R is a linear, branched, or cyclic alkyl or alkenyl group having about 7 to about 48 carbon atoms and M is hydrogen or a counterion selected from the group consisting of Na, K, Ca, $NH_4$, or $NH_x(CH_2CH_2OH)_y$ wherein x and y are each integers from 0 to 4 and total 4.

14. The method of claim 13, wherein the fatty acid or salt thereof is a mixture of such materials having about 12 to 48 carbon atoms and the mixture is derived from a natural oil selected from the group consisting of marine, rapeseed, tallow, tall oil, soy, cottonseed, and coconut oils.

15. The method of claim 13, wherein the amount of the fatty acid or the salt thereof is from about 0.2 to 0.5 wt %.

16. The method of claim 1, wherein the pulp slurry is maintained at a pH of about 7.5 to 11.

17. A method of reducing the total chemical demand of a flotation deinking process which comprises adding to an aqueous waste paper pulp slurry each of (1) a polyester obtained through reaction between a di or tricarboxylic acid or anhydride thereof with a polyalkylene oxide or with an alkylene oxide, (2) a first deinking agent which is an alkoxylated hydrophobic base and (3) a second deinking agent which is an alkoxylated hydrophobic base and which has a cloud point about 2 to 20° lower than the cloud point of the first deinking agent.

18. The method of claim 17, wherein the flotation deinking process further comprises adding a fatty acid or salt thereof of the formula RCOO—M, wherein R is a linear, branched, or cyclic alkyl or alkenyl group having about 7 to about 48 carbon atoms and M is hydrogen or a counterion selected from the group consisting of Na, K, Ca, $NH_4$, or $NH_x(CH_2CH_2OH)_y$ wherein x and y are each integers from 0 to 4 and total 4.

19. A method of increasing the ink removal rate of a flotation deinking process which comprises adding to an aqueous waste paper pulp slurry each of (1) a polyester obtained through reaction between a di or tricarboxylic acid or anhydride thereof with a polyalkylene oxide or with an alkylene oxide, (2) a first deinking agent which is an alkoxylated hydrophobic base and (3) a second deinking agent which is an alkoxylated hydrophobic base and which has a cloud point about 2 to 20° lower than the cloud point of the first deinking agent.

20. The method of claim 19, wherein the flotation deinking process further comprises adding a fatty acid or salt thereof of the formula RCOO—M, wherein R is a linear, branched, or cyclic alkyl or alkenyl group having about 7 to about 48 carbon atoms and M is hydrogen or a counterion selected from the group consisting of Na, K, Ca, $NH_4$, or $NH_x(CH_2CH_2OH)_y$ wherein x and y are each integers from 0 to 4 and total 4.

21. A method of increasing the production rate of a paper mill which processes an aqueous waste paper pulp through a flotation deinking process which comprises adding to the aqueous waste paper pulp slurry each of (1) a polyester obtained through reaction between a di or tricarboxylic acid or anhydride thereof with a polyalkylene oxide or with an alkylene oxide, (2) a first deinking agent which is an alkoxylated hydrophobic base and (3) a second deinking agent which is an alkoxylated hydrophobic base and which has a cloud point about 2 to 20° lower than the cloud point of the first deinking agent.

22. The method of claim 21, wherein the flotation deinking process further comprises adding a fatty acid or salt thereof of the formula RCOO—M, wherein R is a linear, branched, or cyclic alkyl or alkenyl group having about 7 to about 48 carbon atoms and M is hydrogen or a counterion selected from the group consisting of Na, K, Ca, $NH_4$, or $NH_x(CH_2CH_2OH)_y$ wherein x and y are each integers from 0 to 4 and total 4.

23. A method of reducing optical bleach demand for producing paper from a waste paper pulp slurry which is subjected to flotation deinking which comprises adding to the aqueous waste paper pulp slurry each of (1) a polyester obtained through reaction between a di or tricarboxylic acid or anhydride thereof with a polyalkylene oxide or with an alkylene oxide, (2) a first deinking agent which is an alkoxylated hydrophobic base and (3) a second deinking agent which is an alkoxylated hydrophobic base and which has a cloud point about 2 to 20° lower than the cloud point of the first deinking agent.

24. The method of claim 23, wherein the flotation deinking process further comprises adding a fatty acid or salt thereof of the formula RCOO—M, wherein R is a linear, branched, or cyclic alkyl or alkenyl group having about 7 to about 48 carbon atoms and M is hydrogen or a counterion selected from the group consisting of Na, K, Ca, $NH_4$, or $NH_x(CH_2CH_2OH)_y$ wherein x and y are each integers from 0 to 4 and total 4.

25. A method of reducing the stickies content resulting from an aqueous waste paper pulp slurry which is processed by a flotation deinking process which includes a fatty acid, which comprises adding to the aqueous waste paper pulp slurry each of (1) a polyester obtained through reaction between a di or tricarboxylic acid or anhydride thereof with a polyalkylene oxide or with an alkylene oxide, (2) a first deinking agent which is an alkoxylated hydrophobic base and (3) a second deinking agent which is an alkoxylated hydrophobic base and which has a cloud point about 2 to 20° lower than the cloud point of the first deinking agent.

26. The method of claim 25, wherein the flotation deinking process further comprises adding a fatty acid or salt thereof of the formula RCOO—M, wherein R is a linear, branched, or cyclic alkyl or alkenyl group having about 7 to about 48 carbon atoms and M is hydrogen or a counterion selected from the group consisting of Na, K, Ca, $NH_4$, or $NH_x(CH_2CH_2OH)_y$ wherein x and y are each integers from 0 to 4 and total 4.

27. The method of claim 26, wherein a portion of the cyclic di- and/or tri-carboxylic acid and/or anhydride is substituted by an anion.

* * * * *